US 6,693,847 B2

(12) United States Patent
Betts

(10) Patent No.: US 6,693,847 B2
(45) Date of Patent: Feb. 17, 2004

(54) BUOY FOR FISH FINDING METHOD AND SYSTEM

(75) Inventor: David A. Betts, Eufaula, AL (US)

(73) Assignee: Techsonic Industries, Inc., Eufaula, AL (US)

( * ) Notice: Subject to any disclaimer, the term of this patent is extended or adjusted under 35 U.S.C. 154(b) by 0 days.

(21) Appl. No.: 10/228,119

(22) Filed: Aug. 26, 2002

(65) Prior Publication Data

US 2004/0004904 A1 Jan. 8, 2004

Related U.S. Application Data

(63) Continuation-in-part of application No. 10/161,933, filed on Jun. 2, 2002.

(51) Int. Cl.[7] ............................................. G01S 15/96
(52) U.S. Cl. ............................................. 367/3; 367/99
(58) Field of Search ........................... 367/95, 96, 98, 367/99, 111, 134

(56) References Cited

U.S. PATENT DOCUMENTS

| D289,265 S | 4/1987 | Wood et al. ............... D10/46 |
| D296,767 S | 7/1988 | Wood et al. ............... D10/46 |
| 4,757,481 A | * 7/1988 | Orr et al. ..................... 367/96 |
| 4,829,493 A | 5/1989 | Bailey ........................ 367/111 |
| 4,873,676 A | 10/1989 | Bailey et al. ................ 367/98 |
| 5,184,330 A | 2/1993 | Adams et al. .............. 367/111 |
| 5,230,646 A | 7/1993 | Thorup ...................... 441/131 |
| 5,253,220 A | 10/1993 | Wilson, Sr. ................. 367/107 |
| 5,412,897 A | * 5/1995 | Smith .......................... 43/17.1 |
| 5,463,597 A | 10/1995 | Harlev ........................ 367/107 |
| 5,495,689 A | 3/1996 | Cassem ....................... 43/17.1 |
| 5,546,695 A | 8/1996 | Langer ....................... 43/44.98 |
| D389,757 S | 1/1998 | Nishimura et al. .......... D10/65 |
| 5,887,376 A | 3/1999 | Currier et al. ................ 43/17 |
| D422,924 S | 4/2000 | Bendinelli .................... D10/65 |
| 6,122,852 A | 9/2000 | Mechling, IV .................. 43/4 |
| 6,222,449 B1 | 4/2001 | Twining ....................... 340/539 |
| D441,670 S | 5/2001 | Jackson et al. ............... D10/65 |

OTHER PUBLICATIONS

Outer Banks Outfitters Boater' World Marine Centers (1999 Master Gear Catalog), Atlantic Station, P.O. Box 3330, Atlantic Beach, NC 28512, cover, pp. 4, 5, 11–15, 17, 18, 20, 21, 23, 30–34, back cover.
Bass Pro Shops 2000 Master Catalog, Springfield, MO, Cover, p. 238–244.
Brochure, Zercom Marine, 1999, Techsonic Industries, a Division of Teleflex Inc.

* cited by examiner

Primary Examiner—Daniel T. Pihulic
(74) Attorney, Agent, or Firm—Baker, Donelson, Bearman, Caldwell & Berkowitz

(57) ABSTRACT

A fishing system buoy has a watertight bulbous shell housing an electronic load and with a center of mass located within a lower half of the shell. The load includes sonar operatively coupled via a microprocessor with a radio transmitter that has an upright antenna located in an upper half of the shell. The shell has a keel with an eyelet for tethering a fishing line to the shell. The buoy functions both as a fishing bobber and communications relay station for obtaining and transmitting images of fish swimming beneath the bobber.

14 Claims, 10 Drawing Sheets

BUOY FOR FISH FINDING METHOD AND SYSTEM

REFERENCE TO RELATED APPLICATION

This is a continuation-in-part of application Ser. No. 10/161,933 filed Jun. 2, 2002.

TECHNICAL FIELD

This invention relates generally to portable electronic fish finding methods and systems, and particularly to buoys for fish finding methods and systems useable by fishermen along shorelines and river banks.

BACKGROUND OF THE INVENTION

Sonar systems have long been used aboard water craft to detect shorelines, sea bottoms, sunken objects and marine life. More recently sonar based fish finders have been devised for use by fishermen from a river bank or a shore. Exemplary of these are those shown and described in U.S. Pat. Nos. 5,463,597; 5,495,689; 5,546,695; 5,887,376 and 6,122,852. These typically consist of a float or buoy that supports a sonar. The float is tethered as to a fishing pole. A transmission line extends from the float to a display screen that is located beside the shore based fisherman. With this system a fisherman is able to see sonar returns from fish and the immediate bottom terrain received and relayed from the buoy while standing on the bank. The buoy may be located over his or her baited fish hook or even be on the fishing line itself.

Unfortunately fish finders of the just described type have not gained substantial commercial acceptance. One of the main limitations of tethered transducers on the market today is a relatively short length of cable which limits the cast distance. Among their other limitations have been problems associated with rapid electric power exhaustion, the display of false and intermittent echoes, and with interference with similar units being used by other fishermen in the same locale. That both electrical transmission and fishing lines have extended between the float and shore has also been a complicating factor, particularly so where reels are used where line interference can easily occur. Even without reels line interference easily occurs as line tension and slack conditions change during fishing maneuvers.

Accordingly it is seen that a need remains for a portable fish finder for use by shore based anglers that consumes minimal power, that displays more reliable returns, and which can be simply set to avoid interference with another angler using even an identical fish finder in close proximity. It is to the provision of such that this invention is primarily directed.

SUMMARY OF THE INVENTION

In a preferred form of the invention a method of searching for marine life comprises the steps of generating a stream of digital electric sync pulses of a selected pulse length. Sonar pulses are transmitted from a buoyant station in response to sync pulse. Sonar echoes are received at the buoyant station and electric echo signals generated in response thereto. The electric echo signals are radio transmitted to a radio receiver at a shore station where those echo signals are displayed that follow a sync pulse.

In another preferred form of the invention, a buoy to shore fish finding system comprises a buoyant station having a sonar transmitter, a sonar receiver, a sonar to electric signal transducer and a radio transmitter all controlled by a microprocessor. A shore station has a radio receiver and signal display controlled by a shore station microprocessor. The buoyant station microprocessor is programmed to generate sync pulses and to transmit both the sync pulses and transduced sonar echo returns to the shore station. The shore station microprocessor is programmed to display only those echo signals received after a sync pulse.

The system buoyant station or buoy itself is of unique construction. It comprises a bulbous shell or capsule that houses a load and which has a center of mass located within a lower half of the shell. By half is meant generally half, not an exact mathematical or geometric half. The load includes sonar operatively linked via a microprocessor with a radio transmitter that has an upright antenna located in an upper half of the shell. The buoy also has means for tethering a fishing line to the shell which preferably is an eyelet formed in the buoy keel.

BRIEF DESCRIPTION OF THE DRAWING

FIG. 2A is a block diagram of the buoyant-based or sonar remote subassembly while

DETAILED DESCRIPTION

Figure 1:
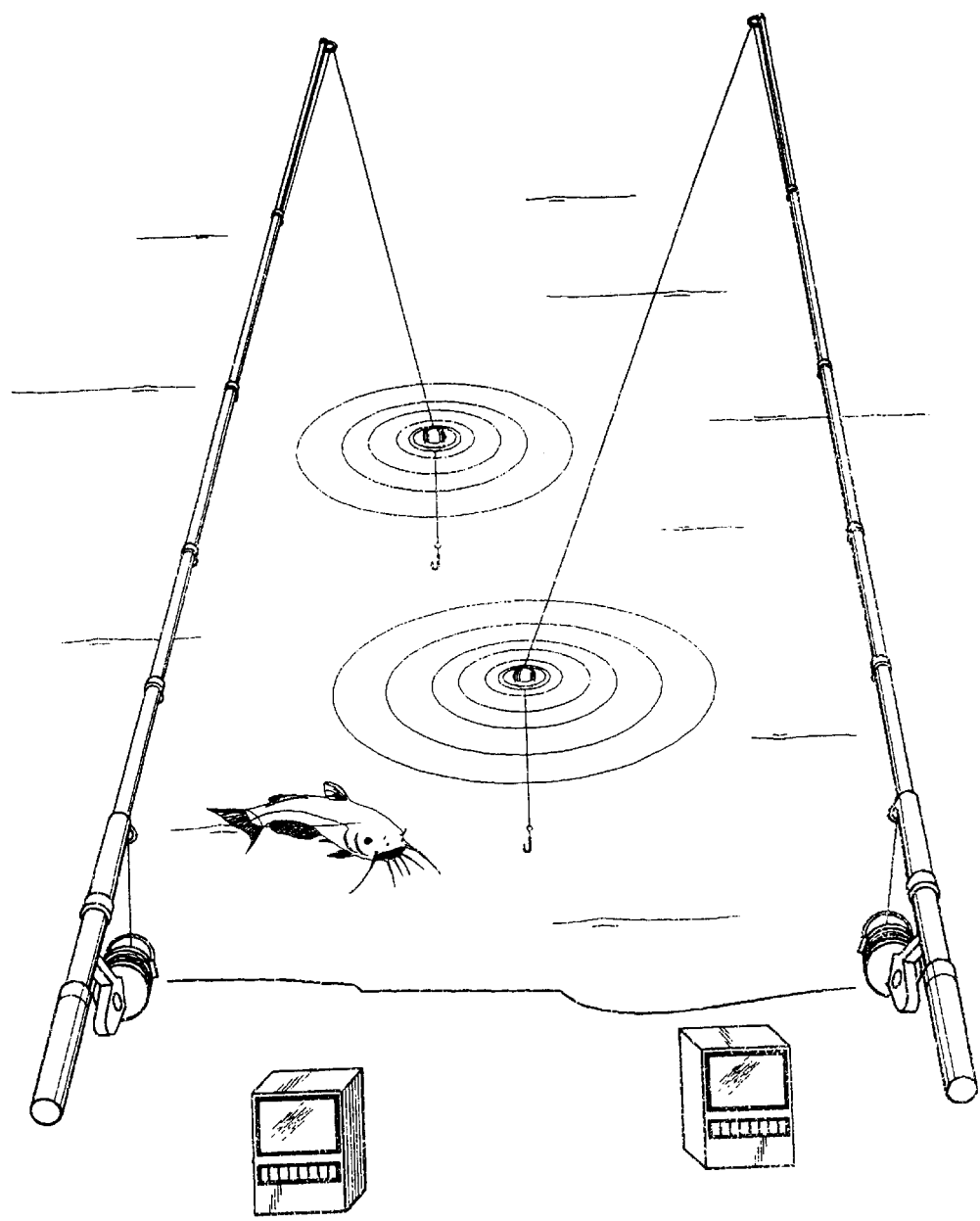
FIG. 1 is a pictorial representation of two fish finders of the present invention being used together simultaneously side by side without significant interference.

Referring now in more detail to the drawing, there is shown in FIG. 1 two fishing poles being used by two fishermen in close proximity. Each has a fishing line that extends from a reel to a fish hook which here is shown unbaited, for clarity. A buoy or bobber is secured to each line above the hook. In this case the buoy houses the buoyant station electronic equipment that is described later in detail. However, the buoyant station for this equipment could alternatively be independent of the fish hook and line. A shore station display is shown next to each fishing pole which could be a modified version of a Piranha 4 portable fishfinder sold by Techsonic Industries of Eufaula, Ala.

Figure 2A:
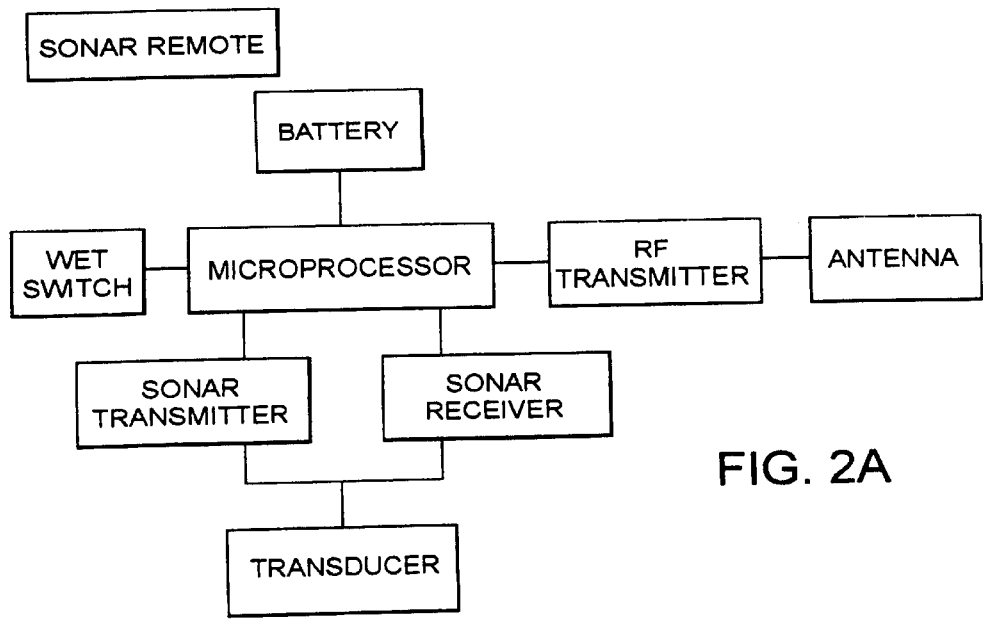

The buoyant station houses within a buoy the sonar remote subsystem shown generally in FIG. 2A. This includes a battery powered microprocessor that controls a sonar transmitter and which processes sonar echoes from a transducer. It also controls an RF transmitter that emits signals from an antenna. The buoyant station also has a battery and a wet switch.

Figure 4:
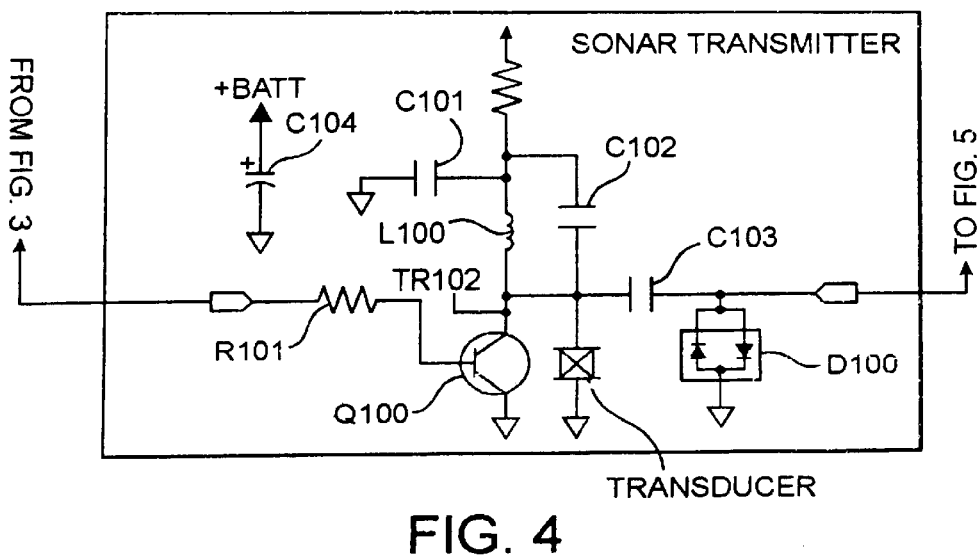
FIG. 4 is a more detailed diagram of the sonar transmitter circuit.

The sonar transmitter is seen in FIG. 4 to have a sonar transmit transistor Q100 that boost 3 volt battery power through an inductive/capacitive tuned circuit L100/C102 to a transmit voltage of about 25 volts peak to peak across the transducer. The transducer converts the voltage into a sound pressure pulse in the water. Echoes may in turn be received by the transducer which converts their pressure waves back to voltages.

Figure 5:
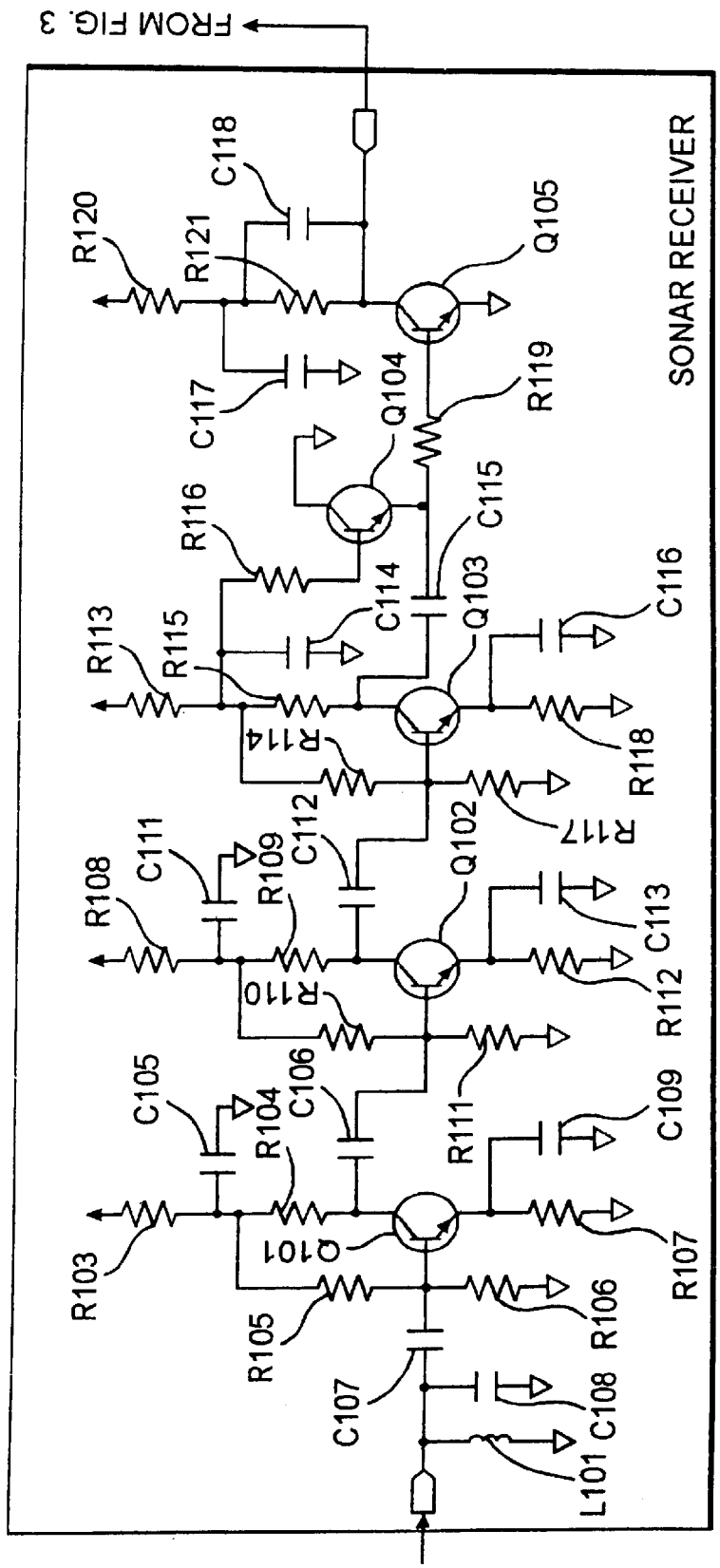
FIG. 5 is a circuit diagram of the sonar receiver.

As shown in FIG. 5 the sonar receiver is powered through resistive-capacitor decoupling networks (R103/C105, R108/C111) that provides a time variable gain function (TVG) for the receiver, that gradually increases the gain with time so that close-in returns have the same size as returns that are more distant. The receiver is a three stage, common emitter, universal bias transistor amplifier (Q101, Q102, Q103). Each stage has a little more than 30 db of gain providing an overall gain of more than 90 db. The resistor bias is chosen for proper impedance matching and low current consumption. The emitter bypass capacitors C109, C113, C116 and the interstage coupling capacitors C107, C106, C112, C115 are chosen to provide additional high pass filtering.

An LC filter L101, C108 provides for bandpass filtering at the input to the receiver section. The filtered ac coupled signal is rectified and demodulated by transistor Q104 and threshold detected by transistor Q105 to a logic level signal that coincides with the width of each received sonar echo. This logic level is input to pin 4 (DETECTOR) so that the microprocessor outputs an RF pulse equal in width to each sonar return on pin 7 (RF_XMITTER).

Figure 6:
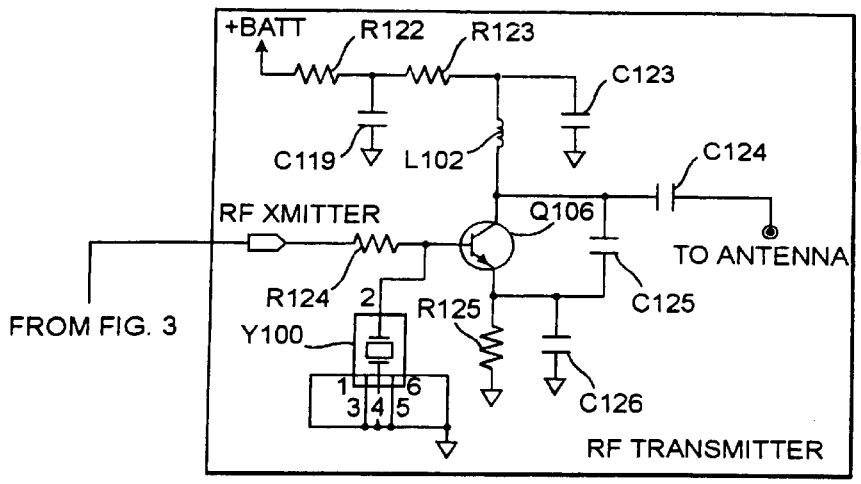
FIG. 6 is a circuit diagram of the RF transmitter.
Figure 7:
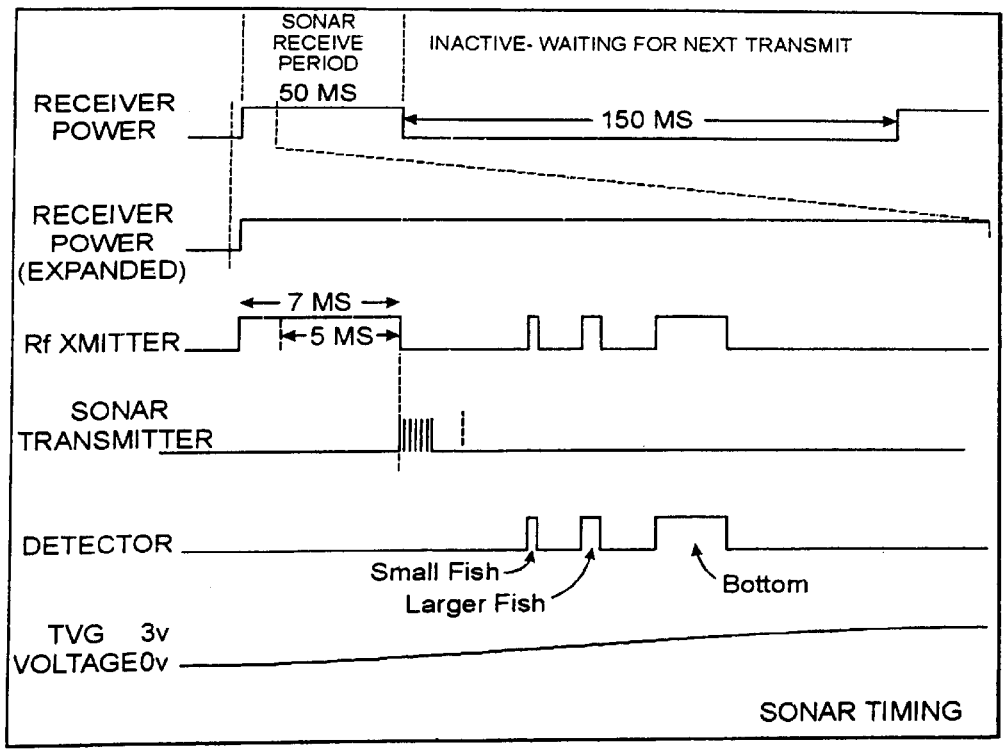
FIG. 7 shows a set of pulse trains that depict power cycles, sync pulses and sonar pulses and return.

The RF transmitter is shown in FIG. 6. It has a transistor Q106 Colpitts oscillator whose frequency is determined by combination of a surface acoustic wave (SAW) resonator along with L102, C125 and C126. This configuration enables low current consumption as no power is used when the transmitter is not enabled.

Figure 2B:
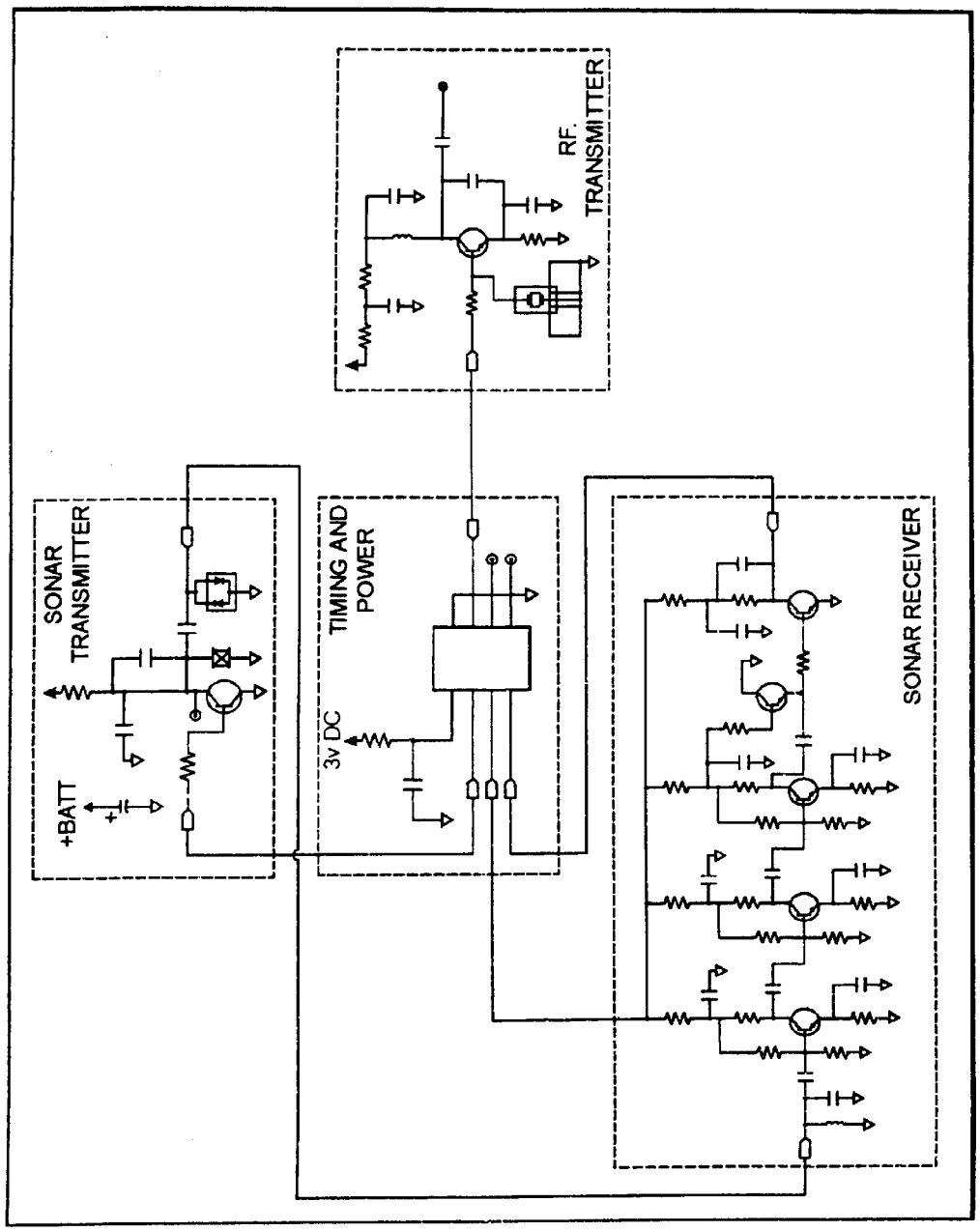
FIG. 2B is a circuit diagram of its sonar transmitter and receiver, its timing and control section and its RF transmitter.
Figure 3:
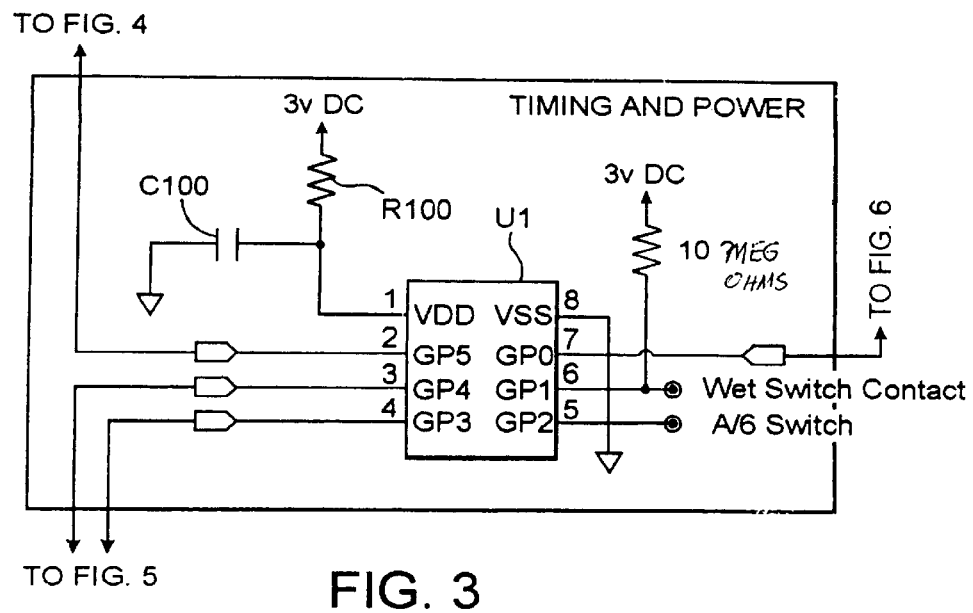
FIG. 3 is a more detailed diagram of the timing and power circuit.

As shown in FIG. 2B and FIG. 3 the sonar transmitter and receiver and the RF transmitter are controlled by a timing and power circuit. This circuit has a PIC 12C508A type microprocessor UI that provides for power and timer controller for the Sonar Remote in the buoy. The wet switch consists of two closely spaced brass contacts that are submerged when the buoy is in water. One contact is connected to system ground and the other is connected to pin 6 (H20)_SW which is pulled high by a 10 meg ohm resistor. As long as the wet switch remains dry the microprocessor remains in sleep mode drawing less than 1 microamp of current from the CR2032, 3 volt lithium battery. When the wet switch is activated by placing as by casting the buoy into water, pin 6 (H20_SW) is pulled low by the conductivity of the water and the microprocessor comes out of its sleep mode. After a few programmed instructions of initialization, the microprocessor brings pin 3 (REC PWR) high which provides power to the receiver portion of the circuitry. The microprocessor enables a sonar receive period of about 50 milliseconds which translates to a range of about 120 feet. After the sonar receive period, the microprocessor takes pin 3 (REC PWR) low, turning off the receiver, and reducing current consumption. The microprocessor waits about 150 milliseconds before it initiates another sync pulse and sonar transmit-receive cycle. The sonar remote therefore has about a 5 pulse per second update rate. This operation continues until the sonar remote is removed from the water and the wet switch becomes dry causing the microprocessor to go back into its sleep mode.

The microprocessor also controls the A/B channel timing so that two sonar remotes can be used in close proximity to each other with minimal interference. If pin 5 (A/B SW) is tied high, then the sonar remote is in the A channel configuration that uses a 7 millisecond sync pulse length. If the pin is tied low, then the B channel is selected and a 5 millisecond sync pulse is used for receiver synchronization. The A channel is selected then a few microseconds after the REC PWR point goes high, the RF XMITTER pin goes high and enables the RF transmitter to transmit a 7 millisecond RF synchronization burst. After the RF sync burst the microprocessor generates a twenty cycle, 120 khz sonar tone burst on pin 2 (S XMIT). Alternatively channel selection may be made by a manual switch. Of course more than two channels may be provided, if desired.

Figure 8:
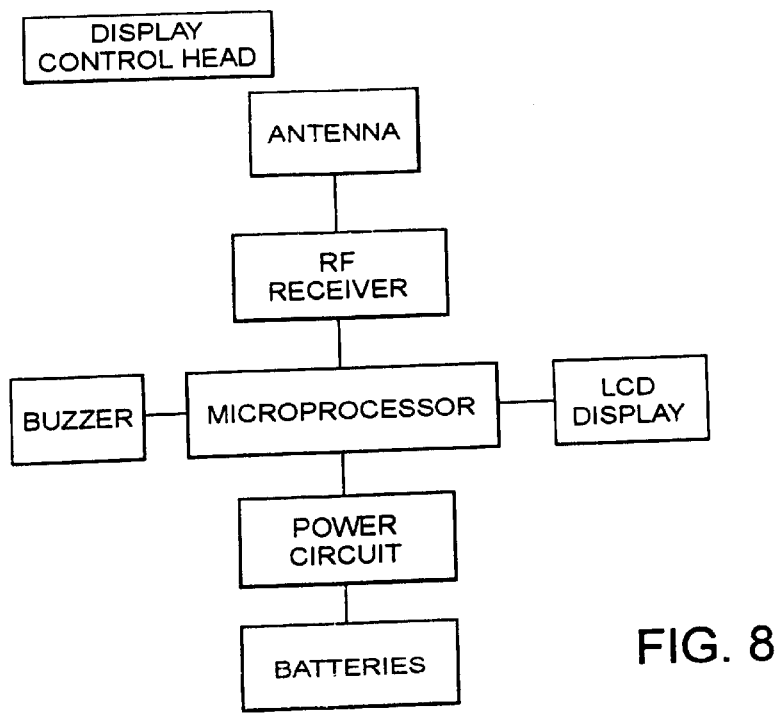
FIG. 8 is a block diagram of the shore-based display control head subassembly.

As shown in FIG. 8 the portable shore station also has its own microprocessor that processes radio signals received by its station RF receiver. It is a super-regenerative receiver with RF preamplifier for increased sensitivity and reduces broadband interference that is inherent with super regenerative type receivers. The receiver amplifies and demodulates signals sent from the buoy station which contain the base-banded envelope of the sync pulses and echo returns. Alternatively, a super heterodyne receiver, ASH or other receiver can be used.

The display control head microprocessor at the shore station implements its programmed algorithms that detect a designated sync pulse. It filters the signals, sorts sonar target returns from the bottom and fish, calculates display range parameters and then feeds the processed signals to the LCD display screen. The display is preferably a graphic display, for example, but not limited on the order of 64 by 128 pixels or other pixel orders. Others such as LED, Flasher, A-scope and digital segment may alternatively be used. Finally the shore station, which is housed in the same unit that has the display screen, is powered by replaceable AA batteries. Its user interface has switches or push buttons that allow for user inputs through a display menu where parameters like depth range, sensitivity, fish alarm may be set. These features and circuits are conventional to existing Piranha finders as well as others.

A representative set of operative values for discrete components of the circuits is set forth in Table 1.

TABLE 1

| Resistors (ohms) | | Capacitors (microfarads) | |
|---|---|---|---|
| R100 | 10 K | C100 | 0.1 U |
| R101 | 3.3 K | C101 | 0.1 U |
| R102 | 10 | C102 | 2700 P |
| R103 | 1 K | C103 | 1000 P |
| R104 | 10 K | C104 | 100 U |
| R105 | 300 K | C106 | 1000 P |
| R106 | 220 K | C107 | .01 U |
| R107 | 4.53 K | C108 | 2700 P |
| R108 | 1 K | C109 | .01 U |
| R109 | 10 K | C111 | 0.1 U |
| R110 | 300 K | C112 | 1000 P |
| R111 | 220 K | C113 | .01 U |
| R112 | 4.53 K | C114 | .1 U |
| R113 | 1 K | C115 | 1000 P |
| R114 | 300 K | C116 | .01 U |
| R115 | 10 K | C117 | .1 U |
| R116 | 100 K | C118 | 1000 P |
| R117 | 220 K | C119 | 4.7 U |
| R118 | 4.53 K | C123 | 100 P |
| R119 | 10 K | C124 | 1 P |
| R120 | 1 K | C125 | 2.2 P |
| R121 | 100 K | C126 | 10 P |
| R122 | 100 | | |
| R123 | 47 | | |
| R124 | 100 K | | |
| R125 | 220 | | |

The first algorithm performed by the control head is sync detector. It tests the incoming signal for a high period that falls within the acceptable limits of an A or B channel selected from the user menu. If a sync pulse is not detected, no updates are made to the LCD display. Once a proper sync pulse is detected, the falling edge of the sync signal indicates when the sonar transmission was initiated and becomes the time zero for determining the depth of the echo targets. The next algorithm performed is data collection. Incoming echo signals are sampled at a high rate (~20,000 times a second) and the samples are processed in real time for the start, end, and width of targets. The X (5) largest targets are sorted and saved. If too many returns are detected (>10), then it is assumed that noise is present and the display is not updated for that transit receive cycle. The targets are then processed by a N of M (2 of 3) filter that requires that the targets are present for N (2) times out of the last M (3) returns. This helps reduce interference from other noise sources as well as data from sonar remotes of the other channel. The targets are then sorted to determine which one is the bottom (usually the longest) which ones represent fish and structures. After the bottom is initially found other bottom tracking algorithms are used to hold onto the bottom. Depth of the bottom or target is determined by the time elapsed from the end of the sync pulse to the start of the target. One millisecond equates to a round trip of about 2.4 feet based on the speed of sound in water of 4800 feet per second. These targets are then displayed on the LCD display.

Figure 9:
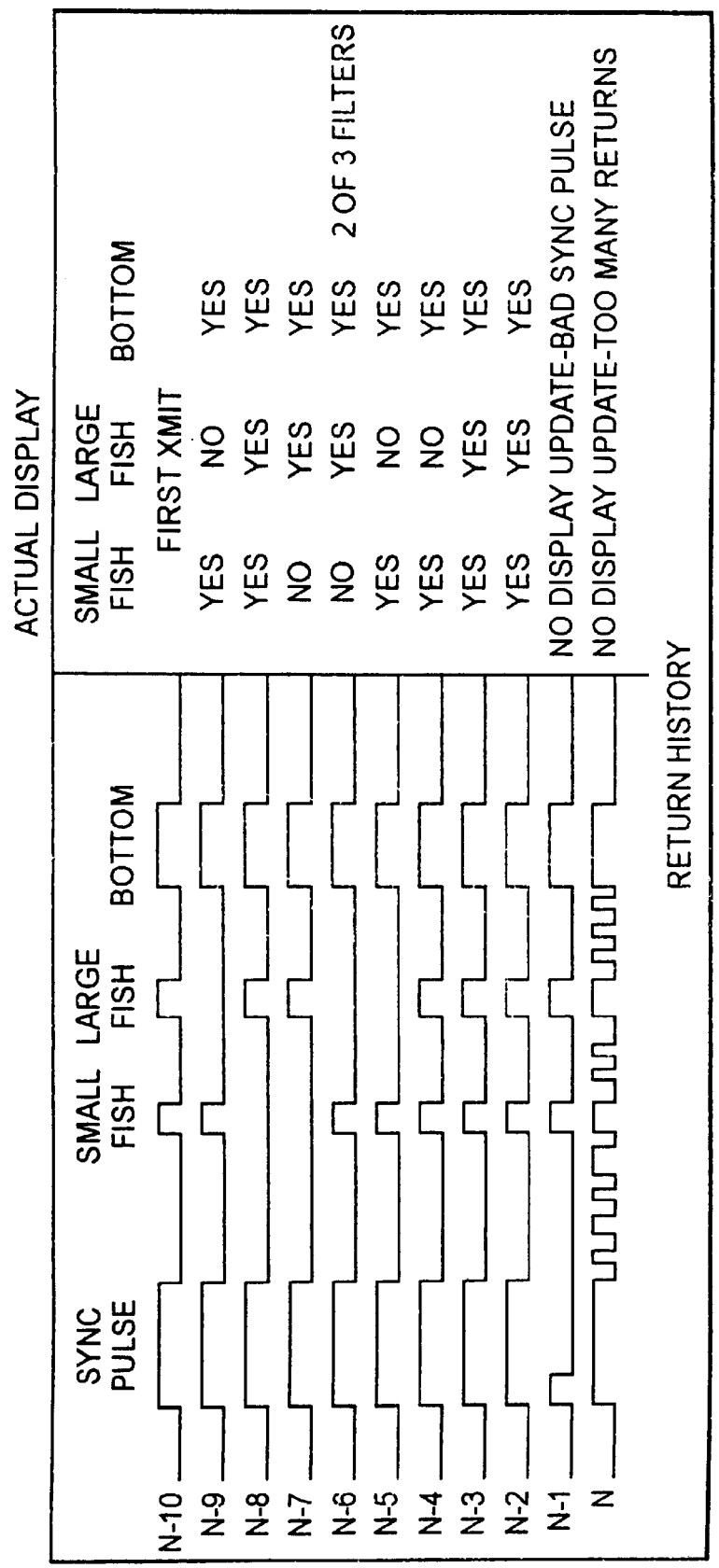
FIG. 9 is a table of target returns as actually displayed at the shore-based station.

The 2 out of 3 filter is effective to screen out unreliable and transient returns as shown in FIG. 9. Here it is seen that unrealistically excessive number of echo returns are excluded as are those that follow an erroneous sync pulse. Echo signals that do follow a sync pulse of the selected length (A or B channel) are displayed but only if they have been received 2 out of the last 3 times following the last succession of 3 sync pulses. This serves to enhance the reliability of displayed target information and to exclude signal anomalies. By displaying only those targets that have been received after sync pulses of preselected pulse length, not all targets are displayed. In this manner even two or more fish finders of the same construction may be used in close proximity without interference by mere selection of different channels. Again, this may be done by menu selection or by manual switch. Though pulse length is the preferred form of establishing and recognizing sync pulses. It should be understood that other waveform parameters could be used such as pulse strength and/or set signals sets of pulses.

Figure 10:
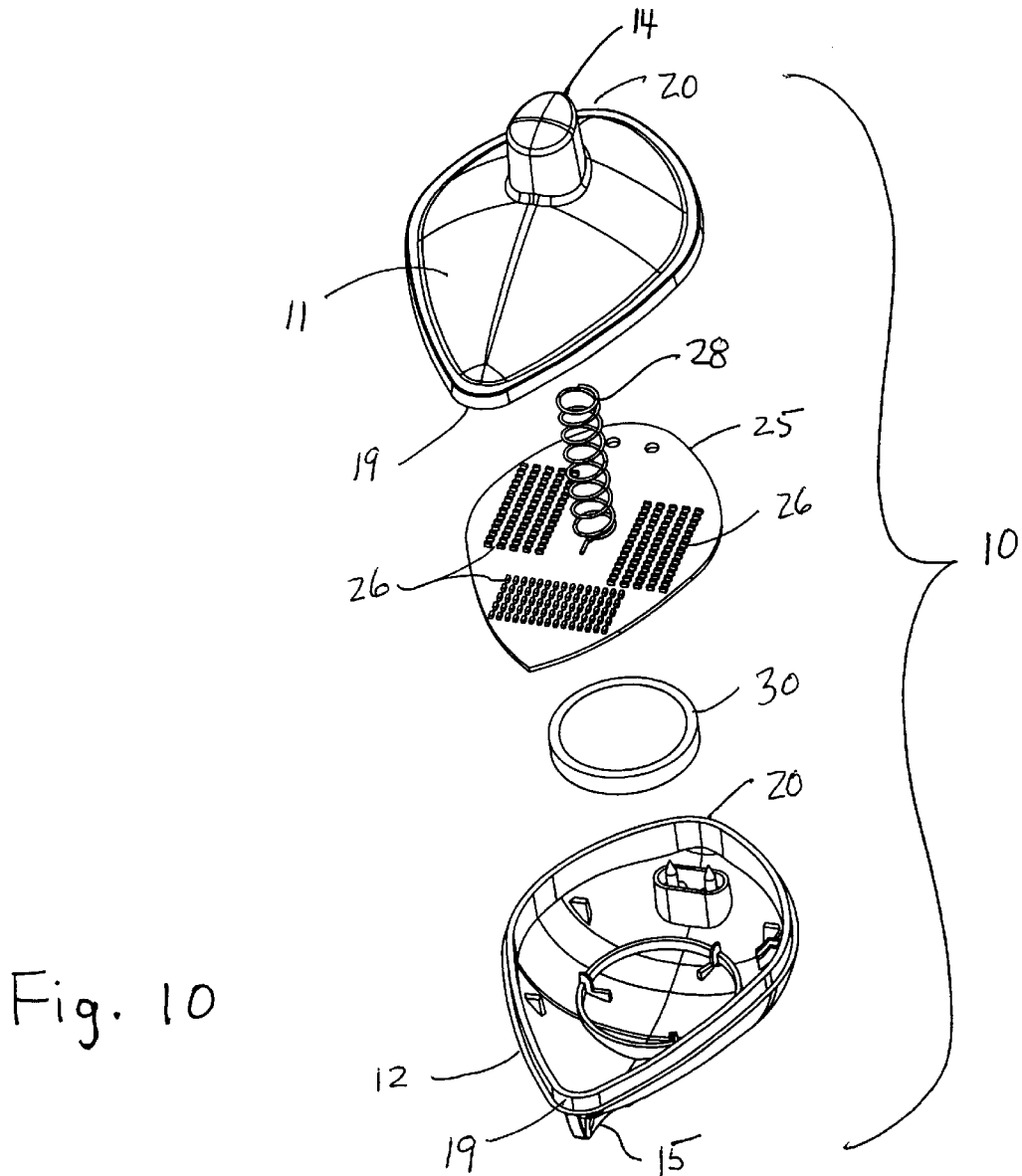
FIG. 10 is an exploded view of the fishing system buoy in its preferred form.
Figure 11:
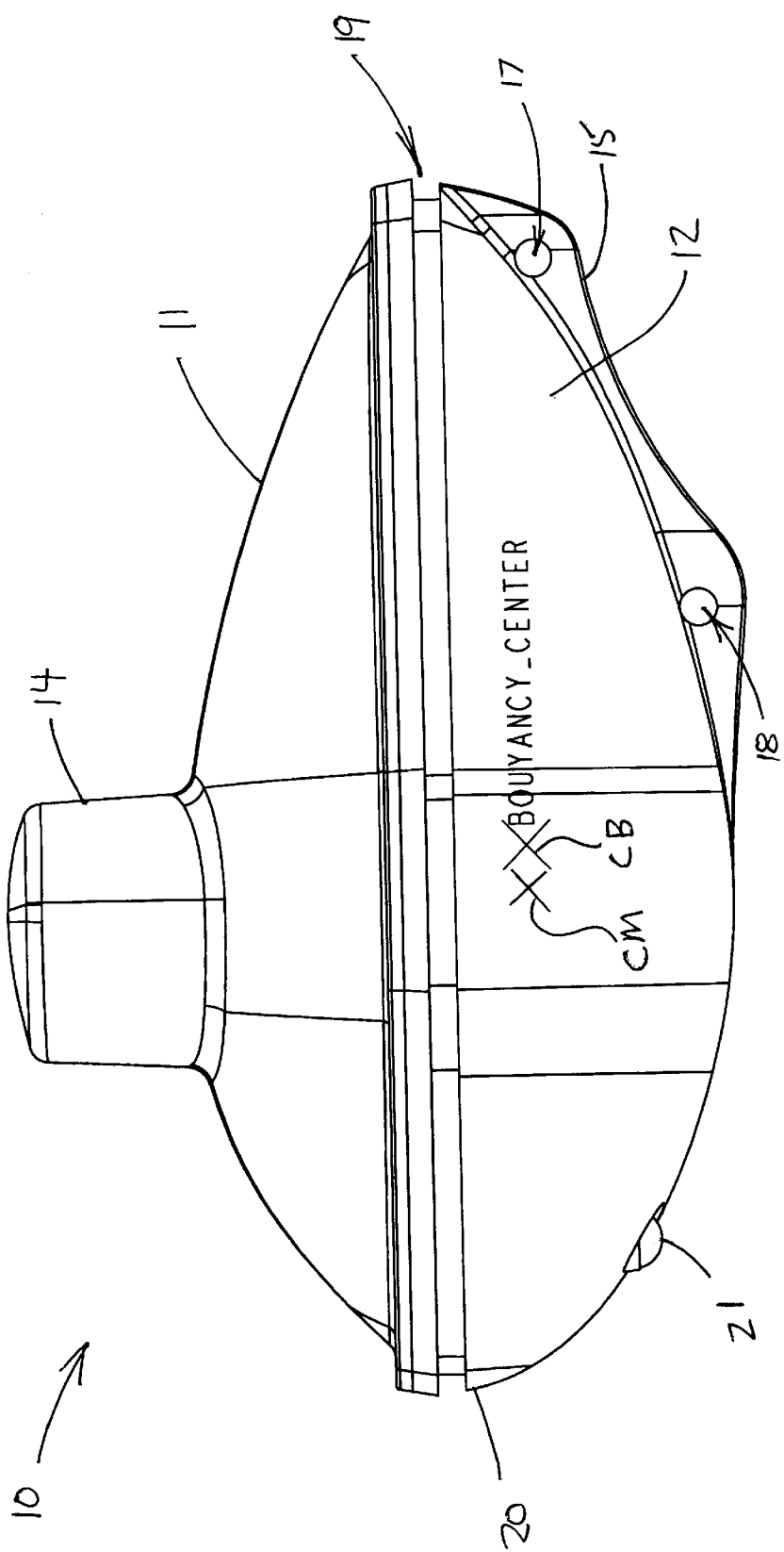
FIG. 11 is a side view of the buoy.
Figure 12:
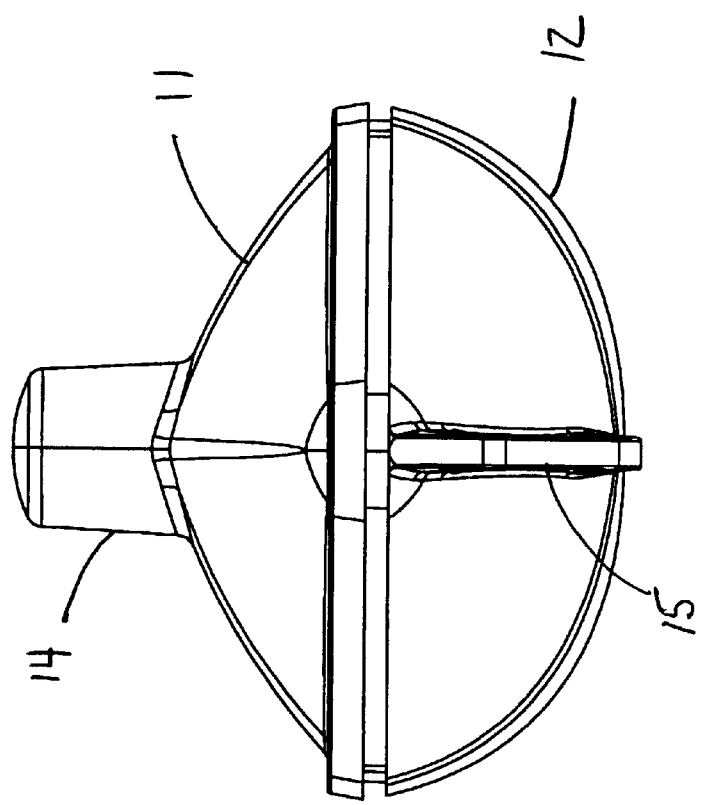
FIG. 12 is a front view of the buoy.

With reference next to FIGS. 10–12 the buoyant station is in the form of a fishing buoy of specialized design, construction and operation. The buoy 10 comprises a shell having an upper shell half 11 and a lower half 12. Again these terms here are general and not meant to be mathematically or geometrically exact. The shell upper half or top is seen to be formed with an antenna tower 14 just aft of midship. The shell lower half or bottom 12 is formed with a keel 15 which has a forward eyelet 17 and an aft eyelet 18. The keel extends from the buoy bow 19 to about midship. The shell bottom adjacent its stern 20 has a protruding sensor 21 that senses water to activate the battery that powers the sonar and electronics housed within the shell.

As best shown in FIG. 10, the buoy houses the previously described circuitry that includes sonar transmitter and receiver, transducer and radio transmitter all controlled by a microprocessor. These are mostly mounted on a circuit board 25 located adjacent the juncture of a top and bottom shell halves in a generally horizontal plane when the buoy is floated. The system electronics 26 is diagrammatically shown on the top of the circuit board. The radio transmitter antenna is shown at 28 mounted uprightly atop the board 25. It is in the form of a resilient coil that extends upwardly from the board into an antenna tower 14 generally normal to the plane of the board. Other antenna technologies such as ¼ wave and electrically small can also be used. A power supply battery (not illustrated) mounts to a lower surface of the board.

The sonar transponder 30 is seen to be disc shaped and to be mounted to the bottom shell half beneath the circuit board along a plane generally parallel with the board. In the illustrated embodiment, the sonar transducer is secured with epoxy. The components are placed low in the buoy so as to provide the buoy with a center of mass CM and a center of buoyance CB where shown in FIG. 11 and along the plane of the keel 15. Note that the center of buoyancy is located somewhat forward of the center of mass. This is done to have the transponder oriented substantially horizontal for optimum sonar performance when fishing line weight is held dependent from the eyelet 18.

In use, a fish hook line with weight may be tied to the rear eyelet 18 and a reel line to the forward eyelet 17. Alternatively a single line may simply be passed freely through the rear eyelet where the weight is to sink to the bottom of the water body upon which the buoy is cast. Once wet, the sonar and radio transmitters are activated by the wet sensor 21. Sonar pulses are transmitted from and echos received by the transponder 30. The echos are processed as previously described by the microprocessor and the image data relayed to the shore station from the propagation antenna 28. The buoy is been designed to be easily cast, manipulated and retrieved, all while maintaining the sonar transponder and radio transmitter antenna optimally oriented. It has also been found to be versatile in accommodating the different types of fishing rigs used by fishermen.

Though the invention has been described in its preferred forms, it should be understood that many additions, modifications or deletions may be made without departure from the spirit and scope of the invention as set forth in the following claims. It should also be appreciated that the term shore station does not necessarily mean only at a beach, sandbar, riverbank or other location on sand or soil but includes other locations spaced from the buoy station where a fisherman may choose to fish from such as a dock, pier, bridge or boat.

What is claimed is:

1. A fishing system buoy comprising a watertight bulbous shell housing an electronic load and having a center of mass located within a lower half of the shell, a keel mounted to the bottom of said shell lower half substantially along a plane bisecting said shell lower half, said load including sonar operatively coupled with a radio transmitter that has an upright antenna located in an upper half of the shell, and means for tethering a line to the shell that comprises an eyelet in said keel whereby the buoy may function both as a fishing bobber and communications relay station for obtaining and transmitting images of fish swimming beneath the bobber.

2. The fishing system buoy of claim 1 wherein said shell lower half has a bow and a stern, and wherein said keel extends from said shell lower half bow.

3. The fishing system buoy of claim 2 wherein said tethering means comprises two eyelets in said keel with one eyelet for attachment of a line and a fishhook and the other eyelet for attachment of a line from a fishing rod and reel.

4. A fishing system buoy comprising a watertight bulbous shell housing an electronic load and having a center of mass located within a lower half of the shell, said load including sonar operatively coupled with a radio transmitter that has an upright antenna located in an upper half of the shell, means for tethering a line to the shell whereby the buoy may function both as a fishing bobber and communications relay station for obtaining and transmitting images of fish swimming beneath the bobber; and wherein said bulbous shell upper half includes and antenna tower in which an upper portion of said antenna resides.

5. Fishing system buoy of claim 4 wherein said antenna comprises an electrically conductive coil.

6. The fishing system buoy of claim 5 wherein said antenna coil is resilient and resides within said tower.

7. A fishing system buoy comprising a watertight bulbous shell housing an electronic load and having a center of mass located within a lower half of the shell that has a bow and stern, said load including sonar operatively coupled with a radio transmitter that has an upright antenna located in an upper half of the shell, means for tethering a line to the shell, and wherein said buoy has a center of buoyancy located forward of said center of mass whereby the buoy may function both as a fishing bobber and communications relay station for obtaining and transmitting images of fish swimming beneath the bobber.

8. A fishing system buoy comprising a watertight bulbous shell housing an electronic load that includes electronics mounted on a board that is mounted within said shell adjacent the juncture of shell upper and shell lower halves, and said buoy having a center of mass located within a lower half of the shell, said load including sonar operatively coupled with a radio transmitter that has a coil antenna located in an upper half of the shell mounted uprightly on said board and means for tethering a line to the shell whereby the buoy may function both as a fishing bobber and communications relay station for obtaining transmitting images of fish swimming beneath the bobber.

9. A fishing system buoy comprising a shell that houses a sonar and sonar return signal relay radio transmitter with the sonar having a transducer mounted inside the bottom of the shell along a plane, the signal relay transmitter having an antenna inside the top of the shell extending generally normal to the sonar transducer plane, a keel on the outside of the bottom of the shell in a plane generally normal to the sonar transducer plane, and an eyelet through which a fishing line may be extended.

10. A fishing system buoy of claim 9 wherein the shell has a top that includes an antenna tower into which the antenna extends.

11. The fishing system buoy of claim 9 wherein the antenna is coiled.

12. The fishing system buoy of claim 9 wherein the eyelet is formed in the keel.

13. The fishing system buoy of claim 9 wherein the sonar and sonar return signal relay radio transmitter include electric circuitry mounted on a circuit board located along a plane generally parallel to the sonar transducer.

14. The fishing system buoy of claim 13 further comprising a battery mounted in the shell bottom beneath the circuit board.

* * * * *